United States Patent [19]

Del Prato et al.

[11] Patent Number: 4,988,042
[45] Date of Patent: Jan. 29, 1991

[54] AUTOMATED CAR WASH SYSTEM

[75] Inventors: Daniel J. Del Prato, Marlton, N.J.; Sherman L. Larson, Palmyra, N.J.

[73] Assignee: Sherman Industries, Inc., Palmyra, N.J.

[21] Appl. No.: 373,187

[22] Filed: Jun. 26, 1989

Related U.S. Application Data

[62] Division of Ser. No. 84,180, Aug. 12, 1987, Pat. No. 4,946,513.

[51] Int. Cl.⁵ .......................... B08B 3/00; B05B 3/12
[52] U.S. Cl. ................................. 239/263; 239/548; 134/88; 134/172
[58] Field of Search ..................... 239/263, 263.2, 230, 239/548, 750, 1.0; 134/144, 151, 88, 172, 180

[56] References Cited

U.S. PATENT DOCUMENTS

| | | | |
|---|---|---|---|
| 2,541,695 | 2/1951 | Gangewere | 239/263.2 X |
| 2,576,861 | 11/1951 | Shaw et al. | 134/144 X |
| 3,023,756 | 3/1962 | Proctor | 134/144 X |
| 4,220,170 | 9/1980 | Herboit et al. | 134/172 X |

FOREIGN PATENT DOCUMENTS 1461447 12/1968 Fed. Rep. of Germany ...... 134/172

Primary Examiner—Andres Kashnikow
Assistant Examiner—Kevin Weldon
Attorney, Agent, or Firm—William H. Eilberg

[57] ABSTRACT

This invention is an automated system and method for washing automobiles. The invention provides a device which sprays liquid onto the vehicle, while closely following the general contour of the vehicle. The system determines that contour by analyzing and recording patterns of broken light beams when the vehicle passes by an array of photoelectric sensors. The system uses the stored information about the contour of the vehicle to control the movement of a spray bar which contains a set of nozzles. As the vehicle is pulled into the washing area by a conveyor, the spray bar initially moves with the vehicle, spraying the front grille while maintaining a constant distance from the vehicle. Then, the spray bar reverses direction, while the vehicle continues to move forward. The spray bar then travels around the vehicle contour, while adjusting the direction of the nozzles so that the liquid flows in the proper direction. After having traced the entire contour, the spray bar reverses direction again. The spray bar now follows the vehicle, spraying liquid towards the rear fender, until the washing cycle is complete. The spray bar oscillates axially while spraying, to insure that the liquid will reach a large area. The invention also includes a unique shfting mechanism which adjusts the axial position of the spray bar, and thus determines the center of the axial oscillations. The apparatus is preferably controlled by a microprocessor, or its equivalent.

10 Claims, 12 Drawing Sheets

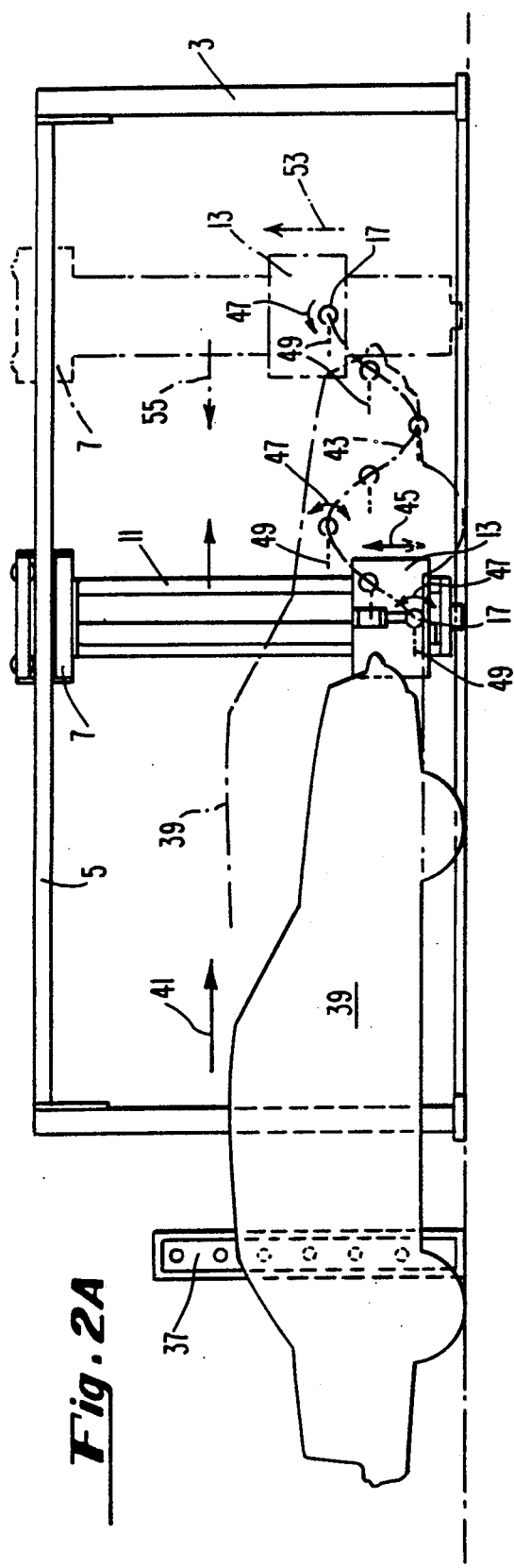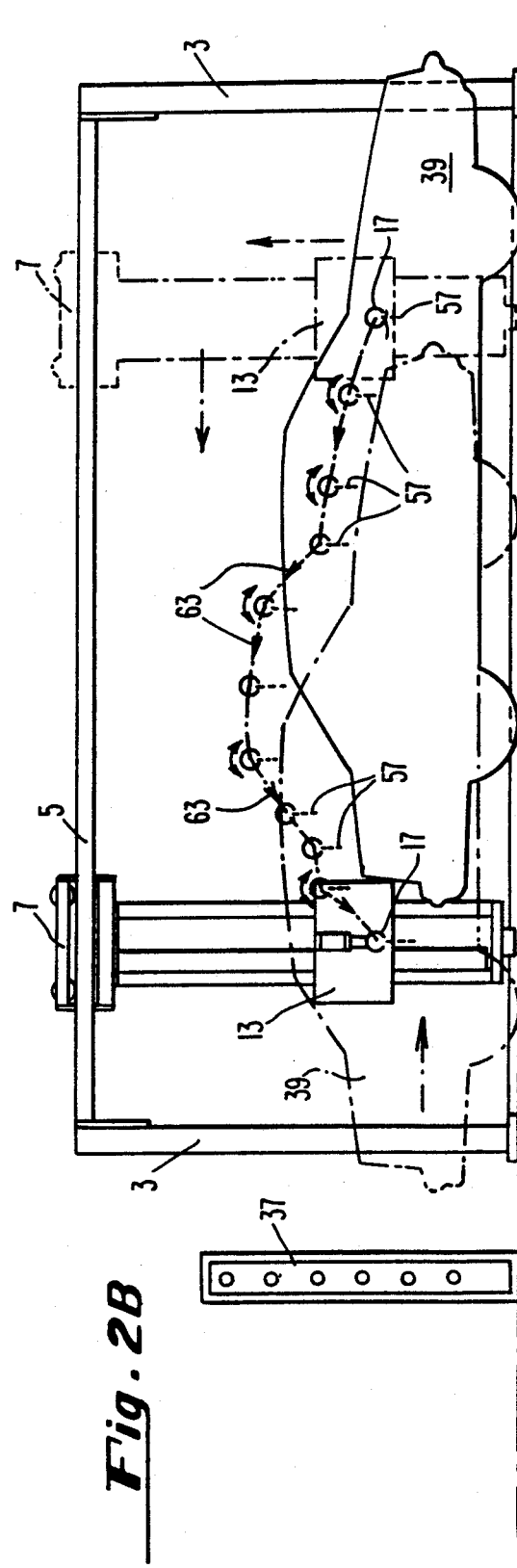

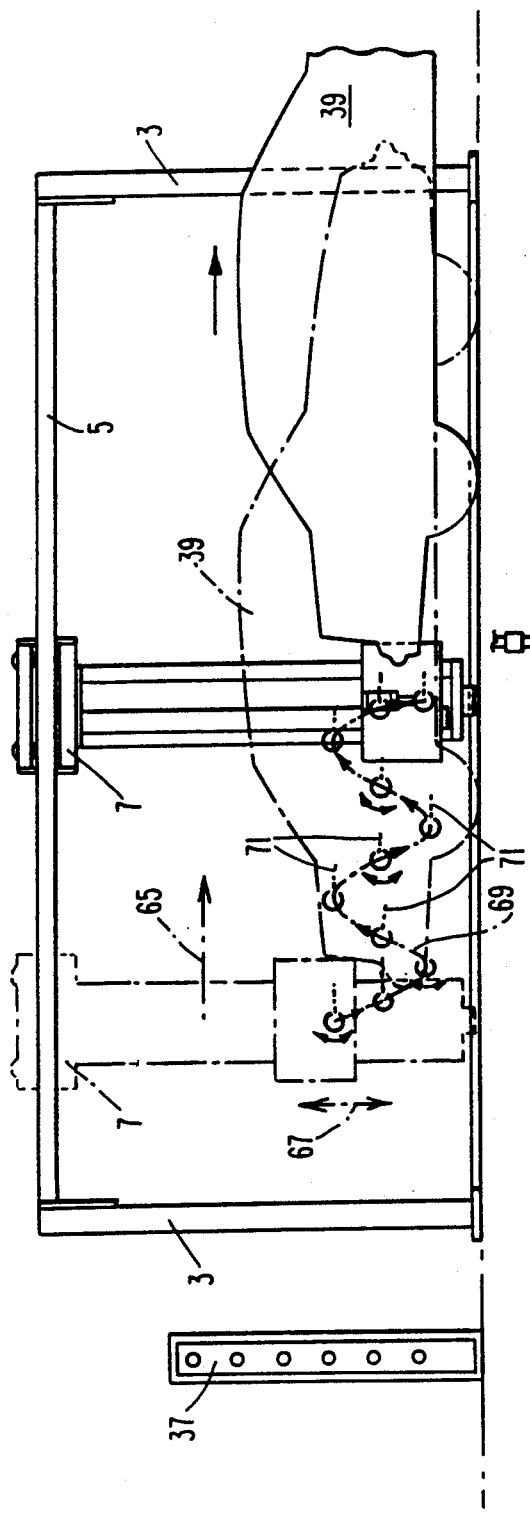
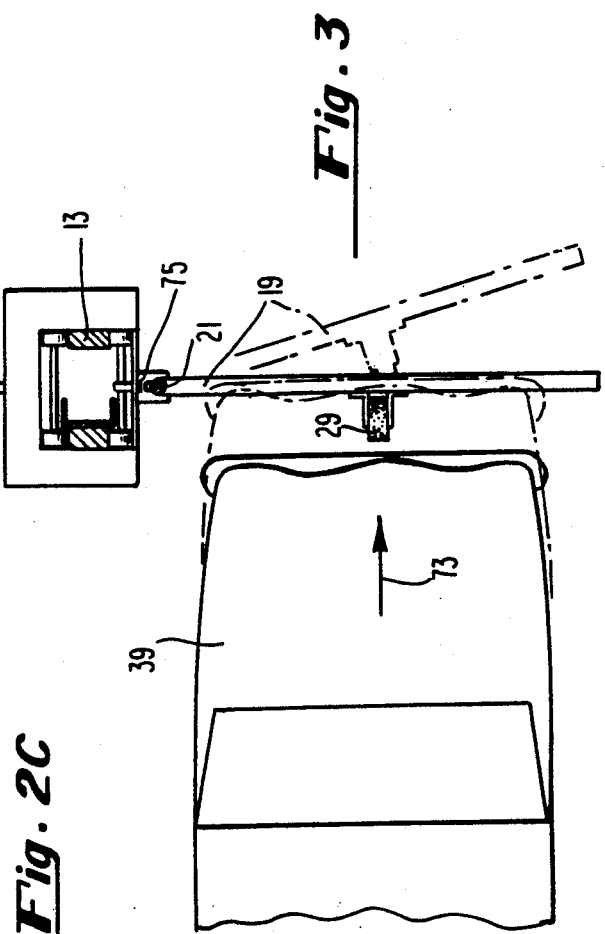

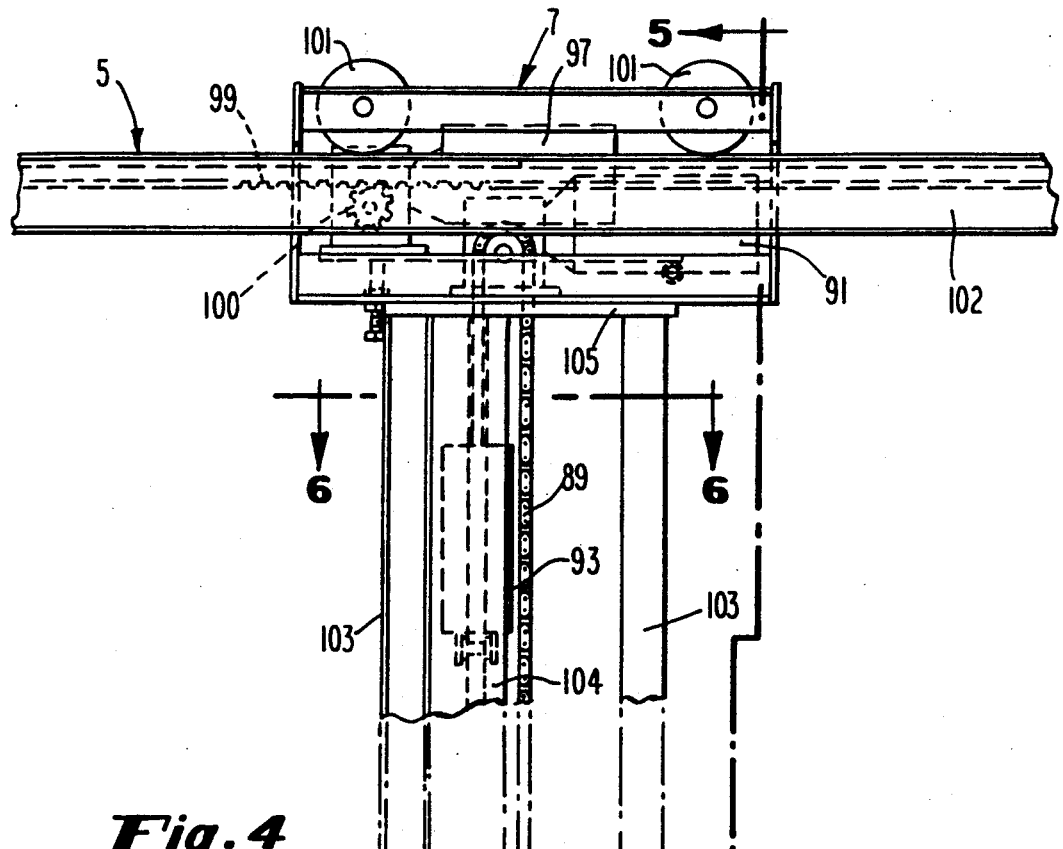
*Fig. 4*
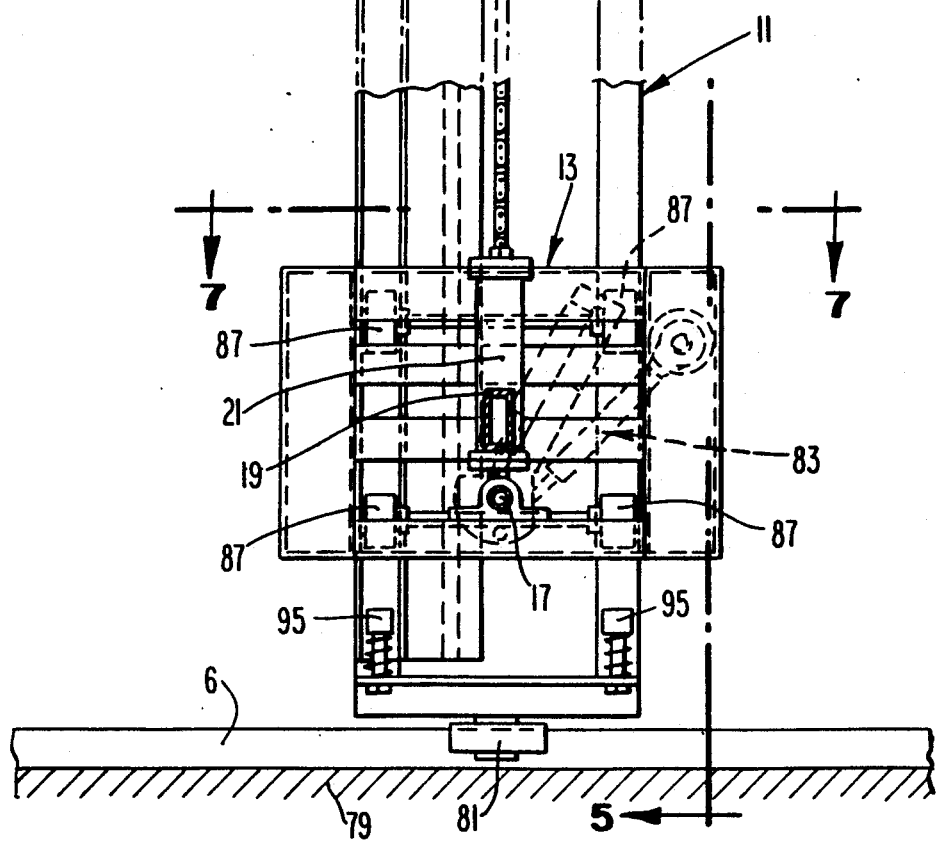

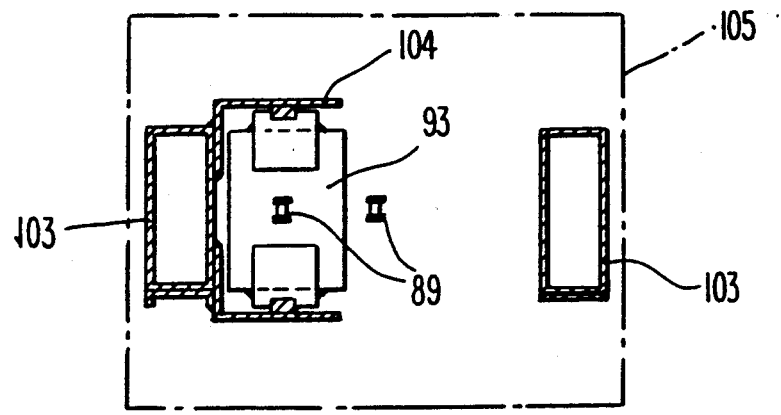
_Fig. 6_
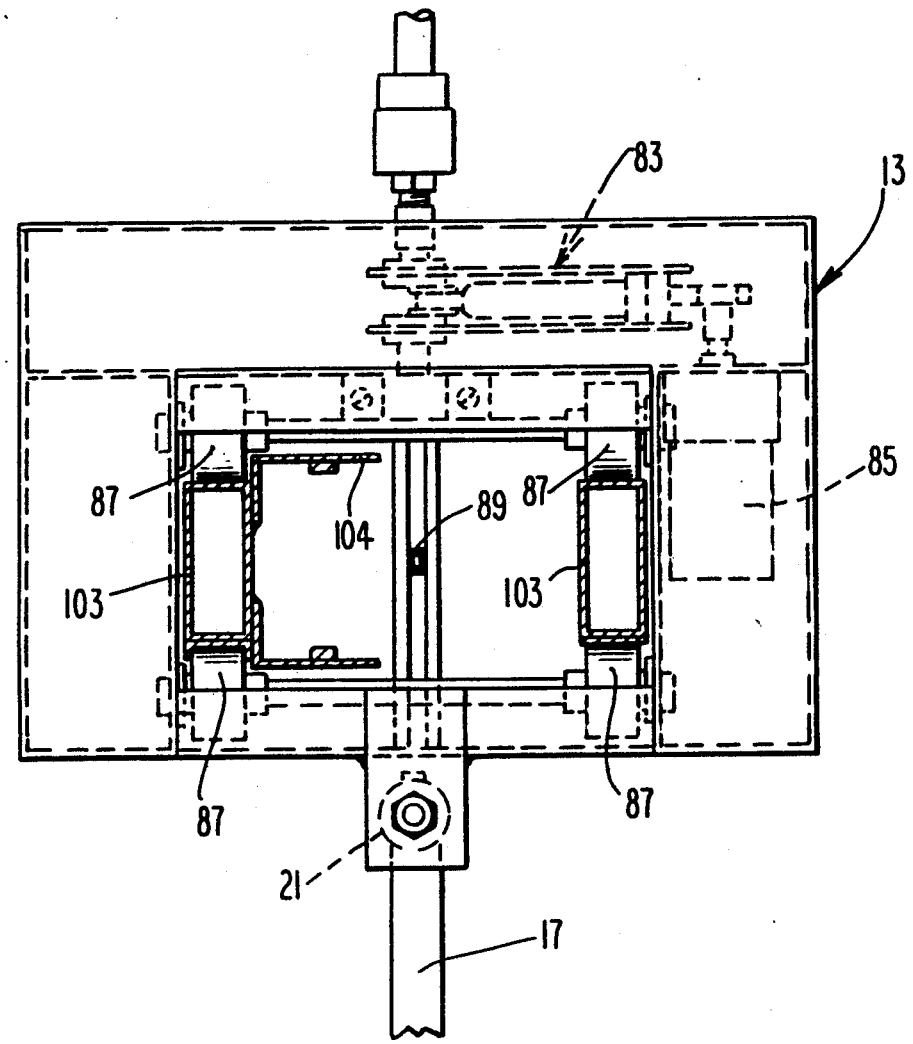
_Fig. 7_

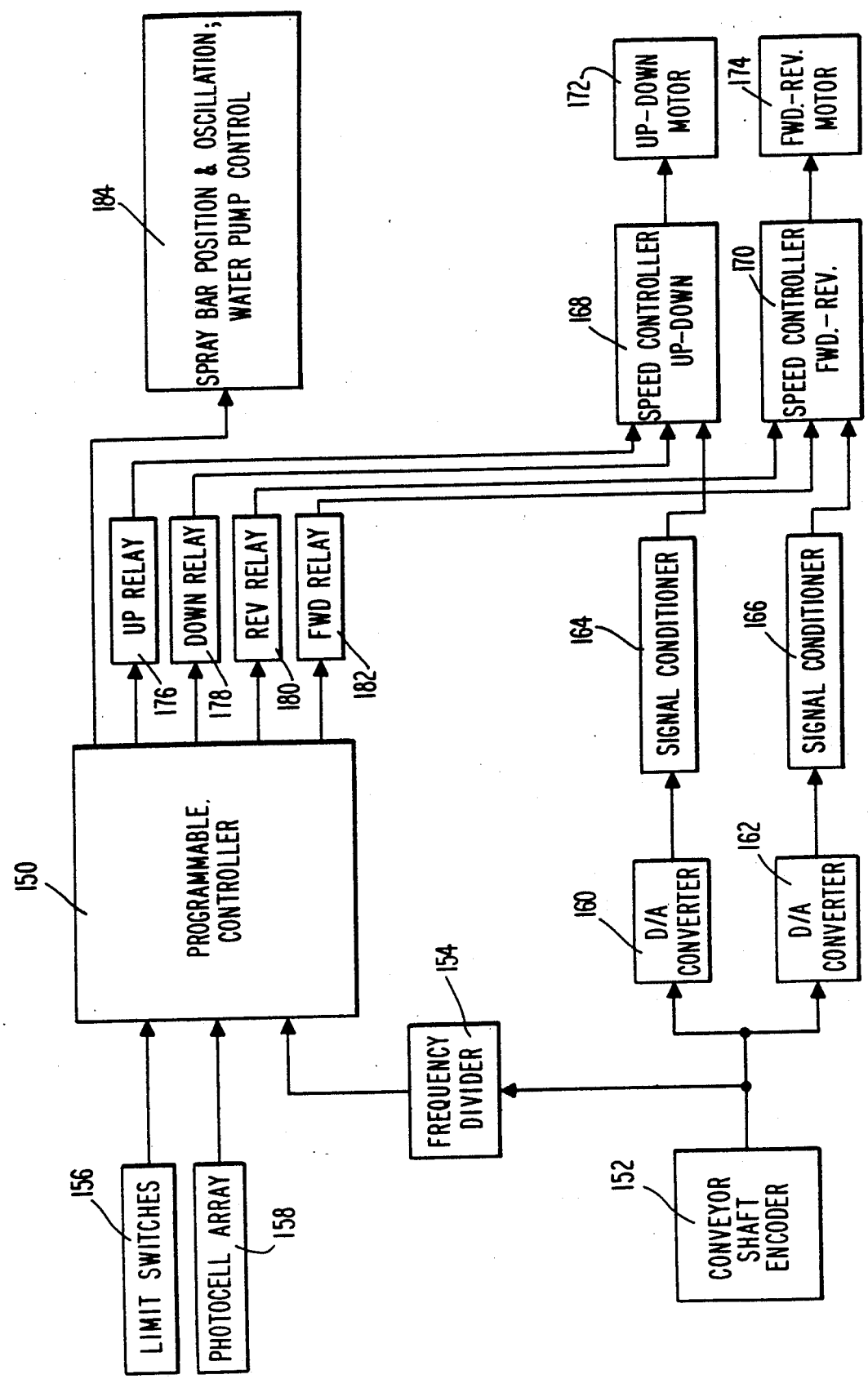

AUTOMATED CAR WASH SYSTEM

This is a division of application Ser. No. 084,180, filed Aug. 12, 1987 now U.S. Pat. No. 4,946,513.

BACKGROUND OF THE INVENTION

This invention relates to the field of automatic car wash equipment. The invention discloses a device which performs a task similar to that performed by the systems described in U.S. patent application Ser. No. 861,326, filed May 9, 1986, entitled "Vehicle Cleaning System and Method", and assigned to the owner of the present invention.

The car was industry has long recognized the need for increased automation of car wash operations. Although automated car washes have been known, the systems used have spray nozzles which are fixed, and which are placed so that they can accommodate vehicles of all shapes and sizes. But, since different vehicles have different shapes and sizes, it is impossible, with a fixed nozzle, to clean all vehicles with equal thoroughness.

Some parts of a car become more dirty than others. The front grille and rear fender areas typically accumulate much more dirt than the top and sides of the car. The systems of the prior art have not solved the problem of how to clean these areas adequately. The prior art lacks a system which closely follows the contour of the vehicle, regardless of the shape of the vehicle passing through the system.

The present invention provides a system which automatically determines the contour of any vehicle passing through the apparatus, and which guides a spray bar around that contour, without any human intervention. Thus, the system and method of the present invention can wash many vehicles, of virtually all shapes and sizes, without adjustment between washes. The system preferably uses a microprocessor to control the movement of the spraying device.

SUMMARY OF THE INVENTION

The most important component of the present invention is a spray bar connected to a carriage which moves horizontally along a frame. The spray bar has a plurality of nozzles for directing water, or other liquids, towards the vehicle being washed. The spray bar moves in three possible ways. First, it moves horizontally along the frame, due to the motion of the carriage which pulls it. Secondly, it moves vertically, because it is connected to a vertically-movable housing which moves along a track connected to the carriage. Thirdly, the spray bar is rotated around its longitudinal axis. The latter motion enables the system to determine the direction in which the liquid is sprayed.

Separate motors control the axial motion of the spray bar and the horizontal motion of the carriage. The carriage is moved along the frame by a rack-and-pinion arrangement. The motor driving the spray bar maintains the spray bar in constant axial oscillation about an equilibrium point. Thus, the nozzles, which are connected to the spray bar, continually sweep through a predefined angular region, insuring complete coverage of the vehicle.

The center of the axial oscillations of the spray bar is adjusted by a novel shifting mechanism. The shifting mechanism includes two cylinders, or their equivalents, which are attached to a pivoting lever. The structure of the lever and cylinders is such that movement of one or both of the cylinders causes rotation of the spray bar, in increments of 90°. By so moving the spray bar, the nozzles can be made to point in various direction, i.e. either forward, rearward, or downward. The nozzles can thus be made to point in the general direction of the oncoming segment of the vehicle. The shifting mechanism has the additional purpose of transmitting the continuous axial oscillatory motion from the motor to the spray bar.

The present invention also includes means for sensing the contour of the vehicle to be washed. Before reaching the washing apparatus, the vehicle passes between a pair of towers which house an array of photoelectric sensors. In the preferred embodiment, one of the towers contains six separate light sources, and the other tower holds six corresponding receivers. Variation in the number of light source and receiver pairs are possible. A computer records the number of beams that are broken, at each given moment, and stores that information. The set of measurements of the status of the beams, taken over a period of time, represents a crude but useful profile of the vehicle. This stored profile is used to control the later motions of the spray bar.

At the start of the washing cycle, the spray bar is located in its "home" position, at the center of the washing area. As the vehicle approaches the spray bar, the bar begins to spray the front grille, while oscillating continuously along its longitudinal axis. When the vehicle has approached to about 18 inches of the vehicle, the spray bar moves forward, at the same speed as the vehicle, while continuing to spray the front grille. While thus traveling in tandem with the vehicle, the spray bar also moves up and down.

Eventually, the carriage which moves the spray bar actuates a forward limit switch, which causes the carriage to reverse direction. Using the information on the profile of the vehicle, previously stored in the computer, the system directs the spray bar over and around the vehicle, following the vehicle contour, while adjusting the position of the spray bar so that the nozzles always point in the general direction of the vehicle.

When the spray bar has traced the entire contour of the vehicle (or when the carriage has actuated a reverse limit switch, indicating that the carriage cannot move further), the carriage reverses direction again. The spray bar once again moves with the car. During this operation, the nozzles are pointing forward, i.e. towards the rear fender area. The carriage continues to follow the car until it reaches its "home" position.

It is therefore an object of the invention to provide an automated car wash device which washes a vehicle by closely following the vehicle contour.

It is another object of the invention to improve the quality of car washing services, and to reduce the cost of providing such services.

It is another object of the invention to increase the level of automation of car washing services.

It is another object to provide a method of automatically controlling a car wash device, such that the device closely follows the contour of a vehicle.

It is another object to simplify the mechanism used to control the motion of a spray bar used in an automated car wash system.

It is another object to provide a novel mechanism which adjusts the axial position of a spray bar, by moving the bar through fixed angular displacements, and which also transmits small axial oscillations to the spray bar.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 2A is a simplified diagram, in side elevation, showing the movements of a vehicle and the carriage, while the carriage is in front of the vehicle.

FIG. 2B is a diagram similar to FIG. 2A, showing the movements of the vehicle and the carriage, as the carriage travels along the contour of the vehicle.

FIG. 2C is a diagram similar to FIGS. 2A and 2B showing the movements of the vehicle and the carriage, when the carriage is behind the vehicle.

FIG. 3 is a partially-fragmentary top view, showing the vehicle approaching the spray bar, and also showing the pivoting motion of the spray bar.

FIG. 4 is a view taken along the line 4—4 of FIG. 5, showing the carriage and the vertically-movable housing which is connected to the spray bar.

FIG. 6 is a cross-sectional view, taken along the line 6—6 of FIG. 4.

FIG. 7 is a cross-sectional view taken along the line 7—7 of FIG. 4.

FIG. 8A shows one of the cylinders of the shifting mechanism in its extended position.

FIG. 9 is a block diagram showing the control of the system of the present invention.

DETAILED DESCRIPTION OF THE INVENTION

Figure 1:
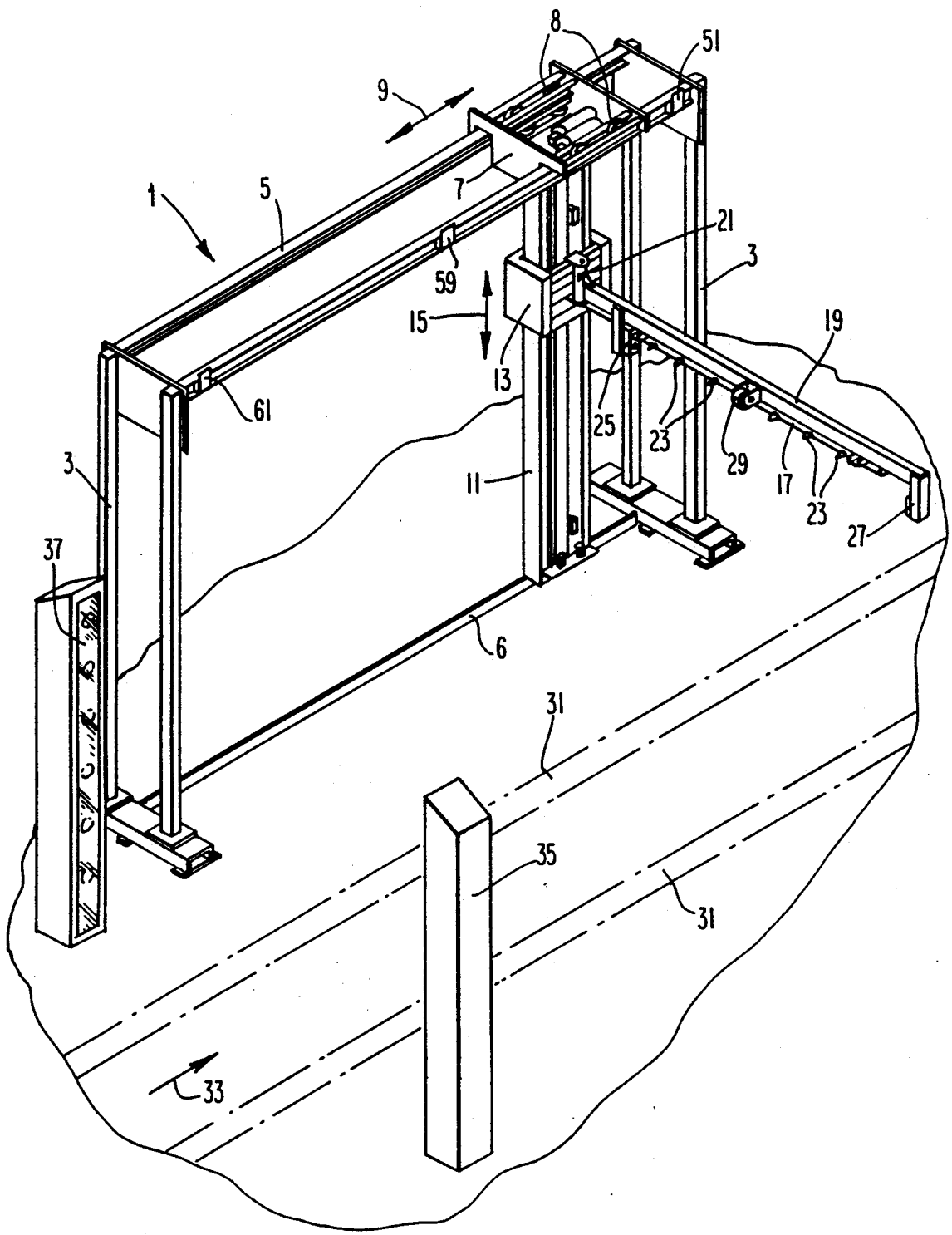
FIG. 1 is a perspective view of the carriage and spray bar of the present invention. The figure also shows part of the photocell array, and part of the conveyor which moves vehicles through the system.

FIG. 1 is a perspective view of the spray bar apparatus 1 which is the essential structural component of the present invention. The spray bar apparatus includes a stationary frame which has leg assemblies 3, bridge assembly 5, and bottom member 6. Carriage 7 moves horizontally along bridge assembly 5, in the directions shown by arrow 9. Vertically-movable housing 13 moves along vertical track assembly 11, in the directions shown by arrow 15. Spray bar 17 is mounted under beam 19, and both the spray bar and the beam are pivotably mounted to housing 13 at swivel member 21.

Spray bar 17 has a plurality of nozzles 23 which can spray water or any other suitable cleaning fluid. The spray bar is axially rotatable, so that the nozzles can be pointed in various directions. The details of the control of the axial rotation of the spray bar will be discussed later.

Also attached to beam 19 are photoelectric receiver 25 and light source 27, and cushioned member 29. The purpose of the photoelectric receiver and light source is to protect the vehicle and the spray bar in the event of a malfunction. The spray bar is not intended to touch the vehicle. If the beam from light source 27 is ever broken, the system immediately raises the spray bar, moving it away from the vehicle. The system then stops. Moreover, if the vehicle comes too close to the spray bar, it will first touch cushioned member 29. Pressure on the cushioned member causes the spray bar to pivot around swivel member 21, causing actuation of a switch (not shown in FIG. 1) which stops the system. The cushioning on member 29 prevents damage to the vehicle. The swiveling motion of the spray bar prevents damage to the system. In the preferred embodiment, the cushioned member is a rubber wheel, but other materials and shapes can be used.

FIG. 1 also shows three limit switches mounted on bridge assembly 5. Forward limit switch 51 senses when the carriage has moved to the forward end of the bridge assembly. "Home" limit switch 59 senses when the carriage is in the "home" position. Reverse limit switch 61 senses when the carriage has reached the rear end of the bridge assembly.

A conveyor, symbolically illustrated by reference numeral 31, carries a vehicle through the system, in the direction shown by arrow 33. Towers 35 and 37 are placed on both sides of the conveyor, such that the vehicle passes between the towers before entering the spray bar apparatus. One of the towers contains a plurality of light sources and the other contains corresponding photoelectric sensors. The light sources are arranged such that each light source affects only the corresponding sensor on the opposite tower. A vehicle passing between the towers causes some of the light beams to be broken, while other beams remain unbroken. At each moment in time, the system stores the pattern of broken and unbroken light beams, in a memory device. This set of patterns comprises the information which the system later uses to infer the shape of the vehicle during the cleaning operation.

FIGS. 2A, 2B, and 2C show the movements of the vehicle, the carriage, and the spray bar, through a complete cycle of operation of the system. In FIG. 2A, vehicle 39 is shown, in full, after it has entered the system. Carriage 7 is shown in its initial "home" position, which is generally midway between leg assemblies 3. The vehicle travels in the direction of arrow 41.

When the vehicle is about 2–3 feet from the spray bar, the spray bar begins to spray liquid onto the vehicle. It is assumed that, when the carriage was last placed in the "home" position, the spray bar was oriented so that the nozzles would point horizontally, and directly at the next oncoming vehicle. The distance of 2–3 feet is not critical, but is given only as an example. The system can be programmed to begin spraying at other distances.

When the vehicle has moved within a short distance from the spray bar, the carriage begins to move in the same direction as the vehicle, and at the same speed. Thus, the nozzles continue to spray the front grille of the vehicle, while maintaining a constant distance from the front of the vehicle. In the preferred embodiment, this distance is about 1.5 feet, although other values can be programmed into the system.

As the spray bar and carriage move, the spray bar undergoes two additional motions. One of these motions is vertical; vertically-movable housing 13 moves the spray bar up and down, as indicated by arrow 45. The motion of housing 13 is sinusoidal, so that the vertical motion, when combined with the horizontal motion due to movement of the carriage, causes the spray bar to trace a sine wave, designated by reference numeral 43.

The other motion of the spray bar is axial. The spray bar rotates back and forth on its axis, through a small angle. These axial motions are represented by arrows 47. In the preferred embodiment, the amplitude of these axial oscillations is about 22°, although other values can be used. The equilibrium position of the nozzles is indicated by dotted lines 49. This equilibrium position is the position the nozzles would take in the absence of axial oscillations of the spray bar. In FIG. 2A, dotted lines 49 are all horizontal, and point directly at the oncoming vehicle.

Figure 5:
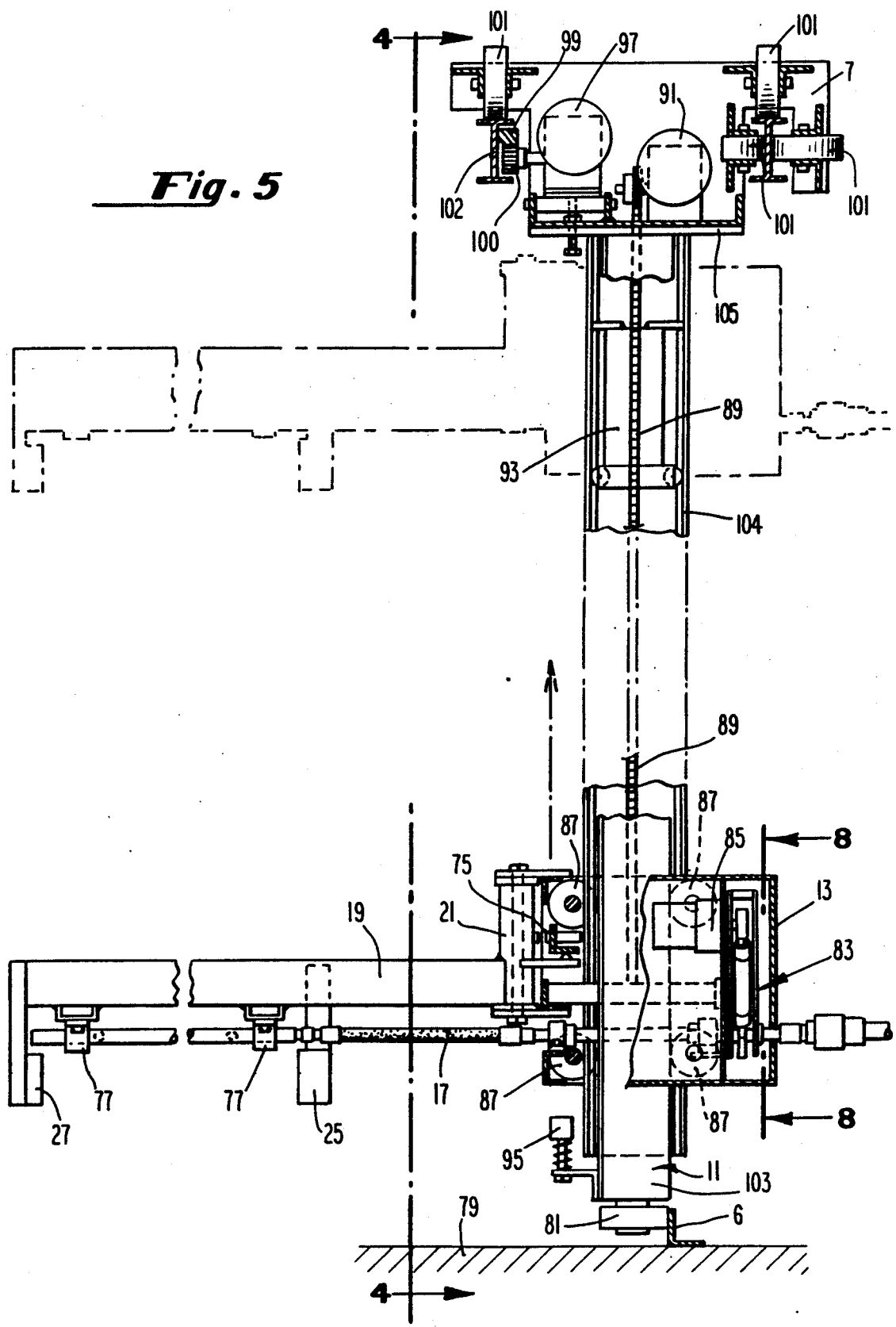
FIG. 5 is a cross-sectional view, taken along the line 5—5 of FIG 4, showing further details of the carriage, the vertically-movable housing, and the spray bar.

When the nozzles first begin to spray, the spray bar oscillates axially, but does not oscillate vertically. The spray bar begins to oscillate vertically when the carriage begins to move horizontally. However, other arrangements can be programmed into the system.

When the carriage has moved far enough to actuate forward limit switch 51, the system reverses the direction of the carriage, and the carriage begins to move towards the vehicle. The system now moves the spray bar around the contour of the vehicle, while maintaining the spray bar close to the vehicle, and pointing the nozzles at the vehicle. These motions of the spray bar are due to the vertical movements of the vertically-movable housing, and the axial movements of the spray bar itself.

FIG. 2A shows, in phantom, the positions of the carriage and the vehicle, after the forward limit switch has been actuated. The vertically-movable housing is moving upward, so that the spray bar can follow the vehicle contour, as shown by arrow 53. The carriage is still moving towards the vehicle, as shown by arrow 55.

Arrows 63 in FIG. 2B show the movement of the spray bar 17 around the contour of the vehicle. In FIG. 28, the initial position of vehicle 39 is shown in phantom, as is the position of carriage 7. As the vehicle moves forward and the carriage moves rearward, the spray bar moves up and down so that it follows closely the contour of the vehicle, without touching the vehicle. Also, as the spray bar passes over various portions of the vehicle, the axial orientation of the spray bar is adjusted so that the nozzles point generally in the direction of the surface of the oncoming segment of the vehicle. Dotted lines 57 indicate the center of axial oscillation of the spray bar, and FIG. 2B shows that, when the spray bar is above the vehicle, the nozzles point generally downward.

In the preferred embodiment, the details of which will be explained later, the spray bar is placed into one of three possible equilibrium axial positions. These positions are rearward (as shown in FIG. 2A), downward (as shown in FIG. 2B), and forward (as shown in FIG. 2C). Thus, when the spray bar is shifted from one position to another, it moves through an angle which is a multiple of 90°. The small axial oscillations of the spray bar occur around these equilibrium positions.

It is also possible to design a system in which the equilibrium positions of the spray bar are not 90° apart. Such a system could aim the nozzles more precisely towards the oncoming surface of the vehicle.

As the carriage moves rearward, as shown in FIG. 2B, it passes the "home" limit switch 59, shown in FIG. 1, which tells the system when the carriage has reached the "home" position. However, the system disables switch 59 temporarily, when the carriage begins to move rearward, so that the carriage does not stop while it is still following the contour of a vehicle.

FIG. 2B shows, in full, the positions of the vehicle and the carriage when the spray bar has traced almost the entire contour of the vehicle. After the spray bar has traced the entire contour, the system again reverses the direction of motion of the carriage. The carriage will follow the vehicle, at a constant, short distance, while spraying the rear of the vehicle.

There are two ways by which the system determines to reverse the direction of the carriage. The first way is through actuation of reverse limit switch 61. The second way is by determining that the entire contour of the vehicle has been traversed.

If the vehicle is fairly large, the carriage may reach reverse limit switch 61 before determining that the entire contour of the vehicle has been traced. If the vehicle is very short, the system may sense that the entire contour has been traversed, without any actuation of the limit switch. The system "knows" when the entire contour has been traversed because it has stored the pattern of signals from the photocell array, at each segment of time. When the system determines that, for the next segment of the vehicle, no light beams were broken, the system "knows" that the entire vehicle has been washed.

FIG. 2B shows, in full, the positions of the carriage and the vehicle, when the carriage is about to reverse direction and follow the vehicle.

FIG. 2C shows the movements of the carriage and vehicle which complete the operating cycle. The beginning positions of the carriage and the vehicle are shown in phantom. The carriage moves in the direction indicated by arrow 65, and also moves up and down, as shown by arrow 67, thereby tracing sinusoidal path 69. The position of the spray bar is adjusted so that the center of axial oscillation is as shown by dotted lines 71. That is, the center of axial oscillation is such that the nozzles point generally towards the rear end of the vehicle. Also, when the carriage begins to follow the vehicle, the system enables the "home" limit switch.

The spray bar thus follows behind the vehicle, at a constant distance. The nozzles direct liquid towards the rear of the vehicle, while oscillating axially. The spray bar also moves up and down, as described above. When the carriage reaches the home limit switch, which was previously enabled, the system stops, and the washing cycle is complete. The system places the spray bar into a position suitable for washing the next vehicle.

The top view of FIG. 3 shows the pivoting motion of the beam and spray bar. Vehicle 39 travels in the direction indicated by arrow 73. If the vehicle comes too close to the beam and spray bar, it touches cushioned member 29, which can be a wheel made of rubber or other soft material. The beam and spray bar then pivot around swivel member 21. The pivoting motion actuates proximity switch 75, which causes the system to stop. It must emphasized that, in normal operation, the spray bar never touches the vehicle. The cushioned member and proximity switch are used only in the event of a system malfunction, to protect the vehicle and the spray bar from damage.

FIG. 5 illustrates more details of the spray bar, the carriage, and the vertically-movable housing. Spray bar 17 is mounted to beam 19 by brackets 77. The spray bar is connected to vertically-movable housing 13, which moves along vertical track assembly 11. Wheel 81 abuts bottom member 6, which comprises a flange, as shown. The flange rests on floor 79, and is rigidly attached to the floor. The wheel is not rigidly attached to the bottom member. The bottom member simply prevents the vertical track assembly from swinging while moving.

Shifting mechanism 83 is located within vertically-movable housing 13. The purpose of the shifting mechanism is to control all axial movements of the spray bar. Motor 85 is connected to the shifting mechanism, and provides power for the small axial oscillations of the spray bar. The structure of the shifting mechanism will be described more fully below.

Vertically-movable housing 13 moves along track assembly 11 with the aid of wheels 87, and is pulled by chain 89 which is driven by motor 91. The other end of the chain is attached to counterweight 93. FIG. 5 also shows, in phantom, the vertically-movable housing in its raised position, wherein the counterweight is near its lowest position. Shock absorbers 95 cushion the movement of housing 13 when it approaches the floor.

Carriage 7 is moved horizontally by motor 97, which drives pinion 100, which in turn is geared to gear rack 99. The gear rack extends along substantially the entire length of bridge assembly 5. The carriage engages I-beams 102 of the bridge assembly through wheels 101.

FIG. 4 shows the carriage and vertically-movable housing, and is taken along the line 4—4 of FIG. 5. Gear rack 99 and pinion 100 are more clearly visible in this figure, as is counterweight 93. The figure also shows the shifting mechanism, in a side view, in dotted outline. The shifting mechanism is described later, with reference to FIGS. 8A-9D.

FIG. 6 shows further details of the counterweight 93, and is taken along the line 6—6 of FIG. 4. FIG. 6 shows mounting plate 105 (also shown in FIGS. 4 and 5) in dotted outline, and also shows vertical members 103 which form vertical track assembly 11. Counterweight moves within counterweight guide 104.

FIG. 7, which is taken along the line 7—7 of FIG. 4, shows more details of vertically-movable housing 13. FIG. 7 also shows vertical members 103 and counterweight guide 104. A portion of spray bar 17 is shown, as is shifting mechanism 83.

Figure 8D:
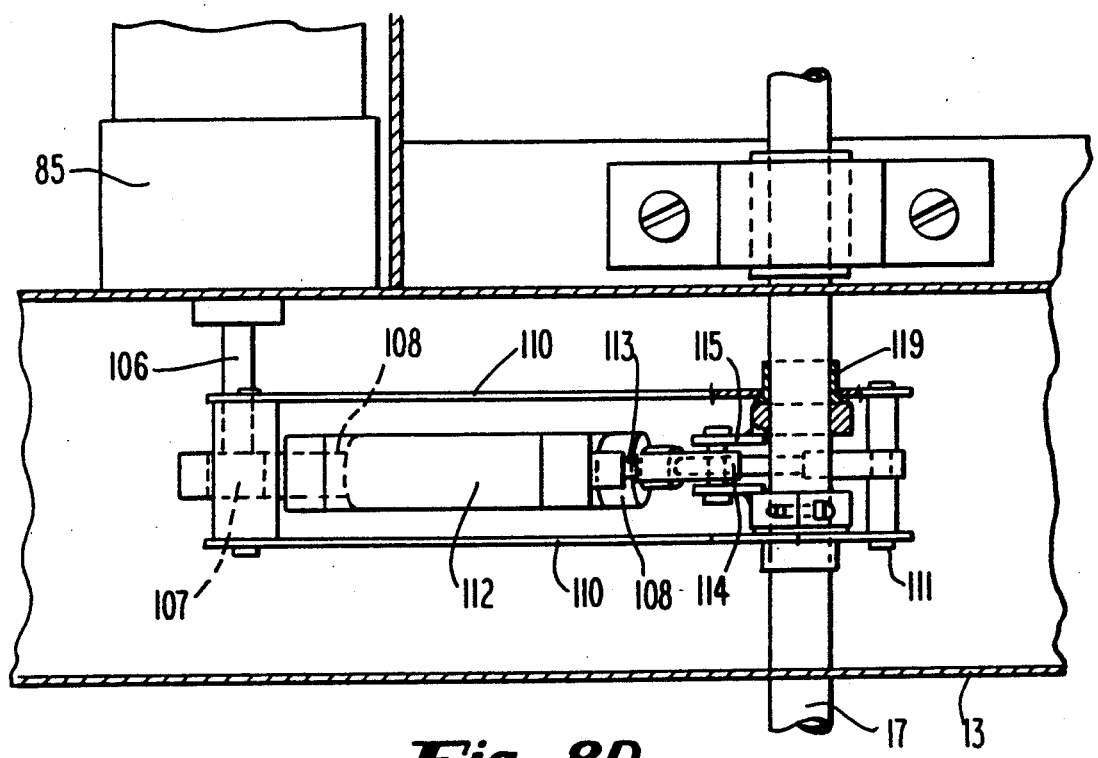
FIG. 8D is a view of the shifting mechanism, taken from the line 8D—8D of FIG. 8A.
Figure 8A:
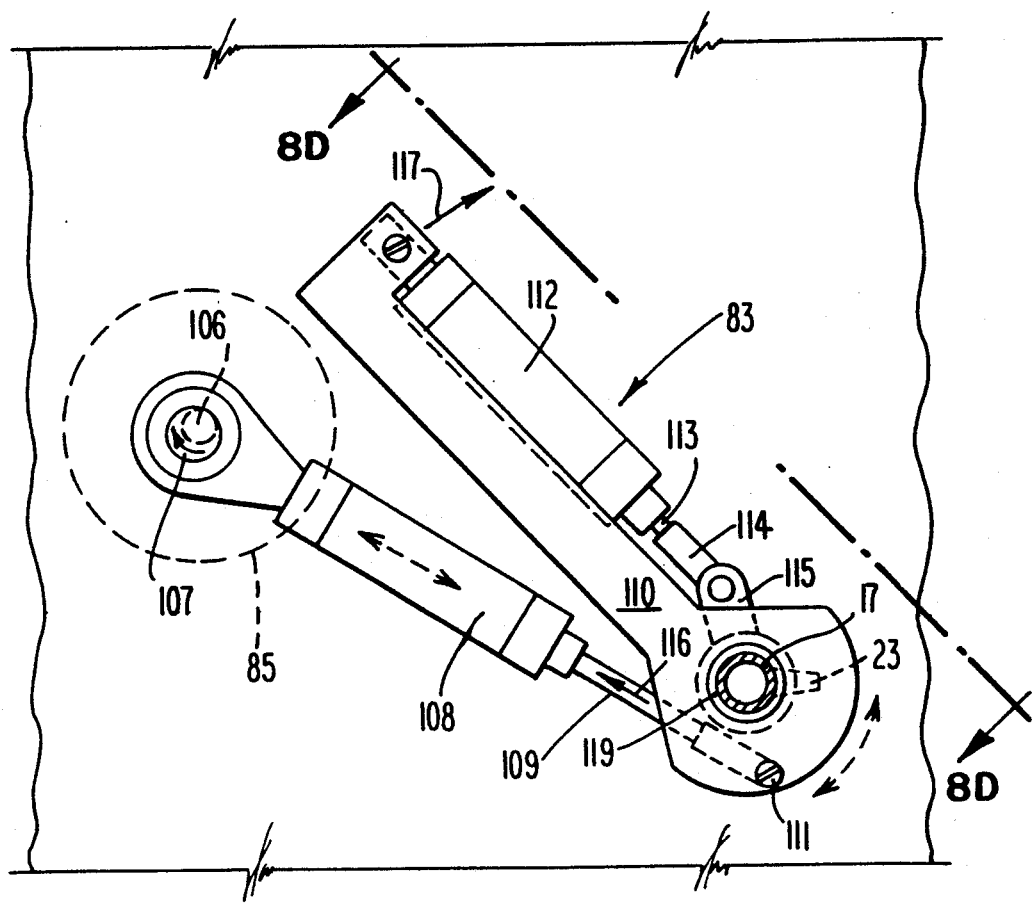
FIG. 8A shows the shifting mechanism which controls the spray bar, and is taken along the line 8—8 of FIG. 5.

FIG. 8A shows shifting mechanism 83. As mentioned above, the shifting mechanism controls the axial position of the spray bar, including both the small axial oscillations and the 90° shifts in angular position.

The shifting mechanism is connected to motor shaft 106 of motor 85 (shown in FIGS. 5 and 7) through eccentric coupling 107. The coupling is connected to first cylinder 108. The cylinder has a piston 109, which is shown in the extended position, FIG. 8A. The piston is connected to shifting lever 110 at first pivot point 111.

Shifting lever 110 is attached to a second cylinder 112 having a piston 113, which is shown in the retracted position. Piston 113 is attached, through link 114, to connecting arm 115. The connecting arm is rigidly connected around spray bar 17, so that rotation of the connecting arm causes axial rotation of the spray bar. However, the shifting lever is not rigidly connected to the spray bar, but is mounted around the spray bar, and is freely rotatable relative to the spray bar.

In the preferred embodiment, the cylinders are operated by compressed air, but any other fluid medium could be used. Also, the cylinders could be replaced by electric motors, or other equivalents, to provide reciprocating movement of the pistons.

FIG. 8A shows one of the nozzles 23, in dotted outline. In this figure, the nozzles are oriented horizontally, and point towards the rear of the spray bar apparatus, i.e. towards an oncoming vehicle.

Figure 8B:
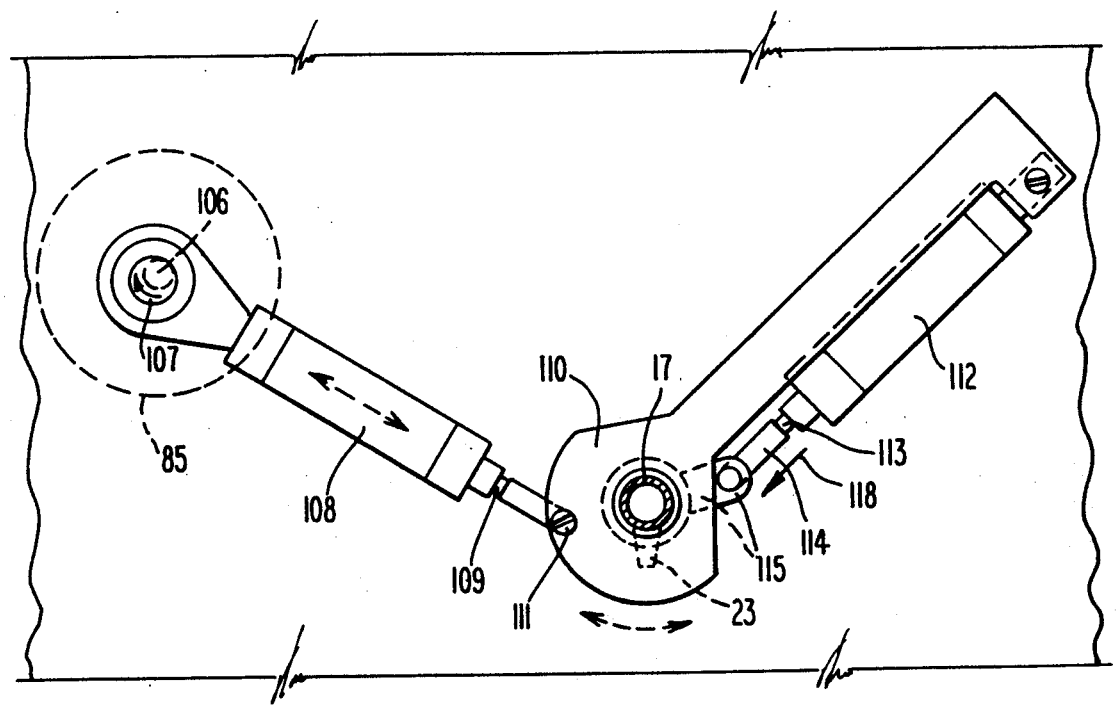
FIG. 8B is a view of the shifting mechanism, wherein the cylinder of FIG. 8A has been retracted, to cause the spray bar to rotate.

Now, if piston 109 is retracted, i.e. moved in the direction indicated by arrow 116, then shifting lever 110 pivots around first pivot point 111, and moves in the direction indicated by arrow 117. This motion of the shifting lever causes connecting arm 115 to rotate, thereby rotating the spray bar. The resulting position is shown in FIG. 8B. Note, that, in FIG. 8B, the nozzles 23 now point downward.

Figure 8C:
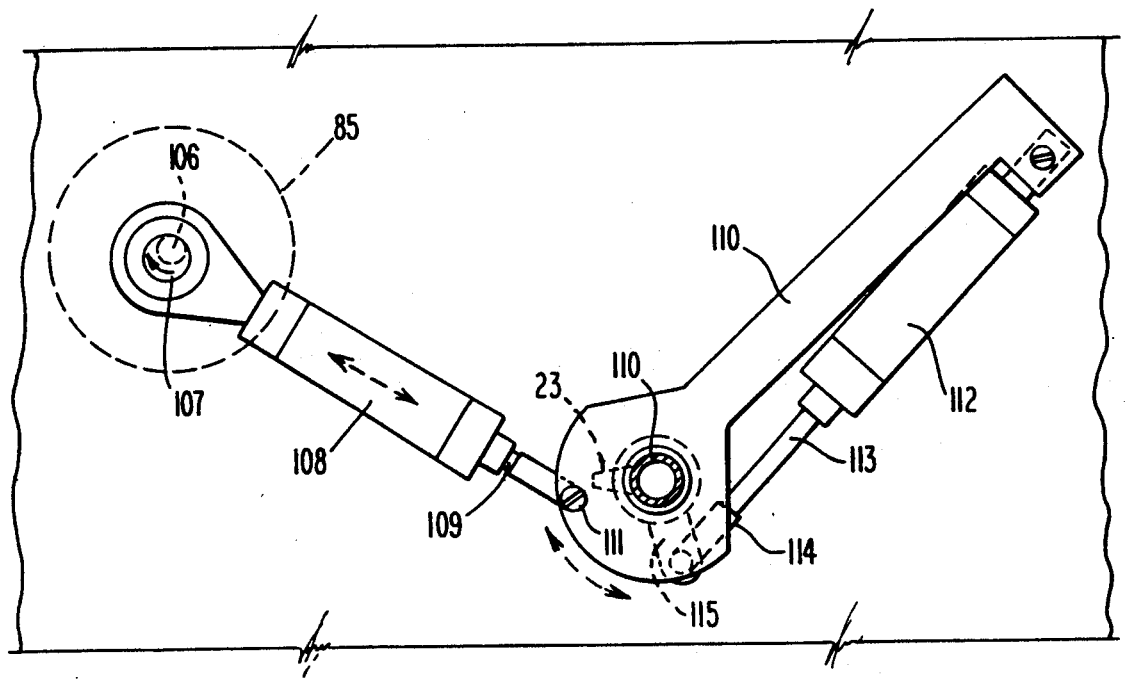
FIG. 8C is a view of the shifting mechanism, similar to FIG. 8B, wherein the other cylinder has been extended, thereby further rotating the spray bar.

Now suppose that piston 113 is extended, i.e. moved in the direction indicated by arrow 118. The position of the first cylinder is unaffected, but piston 113 causes connecting arm 115 to rotate again, turning the spray bar on its axis. The resulting position is shown in FIG. 8C. As shown in FIG. 8C, nozzles 23 now point forward, i.e. in the direction of motion of the vehicle.

Thus, each extension or retraction of the pistons causes the spray bar to turn through an angle of 90°. Movement of the pistons thus places the spray bar in a new angular position. In other words, the position of the pistons determines the center of the axial oscillations of the spray bar.

Eccentric coupling 107 provides the continuous small oscillations of the spray bar. The motor operates independently of the cylinders and pistons. The eccentric coupling translates the rotation of the motor shaft into continuous reciprocal movement of first cylinder 108. But when cylinder 108 reciprocates, shifting lever 110 does the same. Movement of the shifting lever causes movement of the spray bar, as explained above. Thus, the continuous rotation of motor shaft 106 is converted into small, continuous, axial oscillations of the spray bar. These continuous oscillations are thus superimposed on the other movements of the spray bar.

FIG. 8D shows the shifting mechanism in a view taken along the line 8D—8D of FIG. 8A. FIG. 8D shows a portion of vertically-movable housing 13 and spray bar 17. The figure shows second cylinder 112, and a portion of first cylinder 108 (in dotted outline). The figure shows that shifting lever 110 includes two plates. Connecting arm 115 and link 114 are also shown. The shifting lever is mounted to the spray bar with bearing 119 which allows the shifting lever to rotate freely.

FIG. 9 is a block diagram showing the control of the automated car wash system. The essential component of the control mechanism is the programmable controller, illustrated in block 150. The programmable controller can be a microprocessor, or it can be any other automated control mechanism. The present invention has been built using a Model SLC-150 programmable controller, available from the Allen-Bradley Company. However, other controllers can be used, and the invention should not be deemed limited to the use of a particular controller or to a particular means of control.

Controller 150 receives inputs from three sources. The first is from shaft encoder 152, which is attached to conveyor 31. The encoder generates pulses, the frequency of which is proportional to the conveyor speed. If the frequency of the pulses is too great for processing by controller 150, the pulses can be passed through frequency divider 154. The frequency divider can simply be a counter which produces an output pulse when a predetermined number of input pulses have been received. The divider can employ other circuitry, and can be omitted entirely if the controller 150 is designed to process pulses at the frequency generated by the encoder.

The second source of input to the controller is the limit switches, indicated collectively in block 156. The functions of limit switches 51, 59, and 61 have been described above. Block 156 also includes inputs from other switches, such as switch 75, which stops the system if the vehicle comes too close to the spray bar.

The third input to the controller comes from the photocell array, represented symbolically in block 158. In the preferred embodiment, there are six light beams and six photoelectric sensors, but other numbers could be used.

The signal from the shaft encoder is also passed, in parallel, through digital-to-analog converters 160 and 162, and through signal conditioners 164 and 166. The resulting signals are applied, respectively, to speed controllers 168 and 170, which govern the speeds of the motors which move the spray bar and the carriage. The speeds of the motors can thus be adjusted according to the known speed of the conveyor.

Up-down motor 172 drives the chain which moves the vertically-movable housing. Forward-reverse motor 174 operates the rack-and-pinion drive which moves the carriage horizontally along the bridge assembly.

Controller 150 issues signals which operate relays 176, 178, 180, and 182. These relays cause the spray bar to move up or down, or cause the carriage to move forward or in reverse, as indicated. Without a signal from the relays, the respective speed controllers cannot issue a signal to their motors.

The other output from controller 150 is connected to the mechanism which positions the spray bar, and which operates the water pump. Positioning the spray bar includes both orienting the spray bar axially, by adjusting the shifting mechanism, and creating the small axial oscillations. The vertical position of the spray bar is controlled by the up-down motor 172.

Figure 10A:
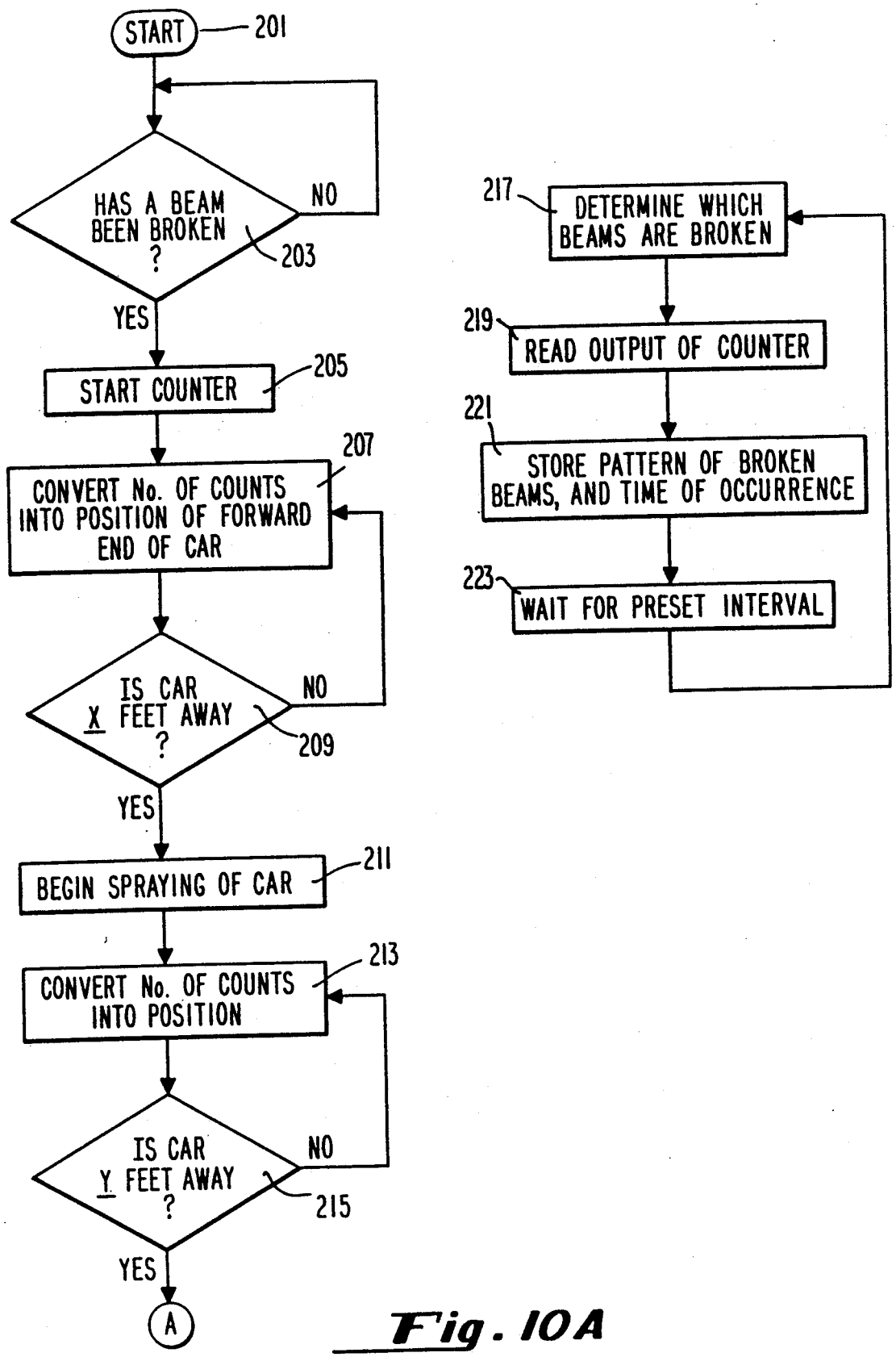
FIGS. 10a—10c is a flow chart illustrating the programming of the computer which governs the operation of the automated car wash system.
Figure 10B:
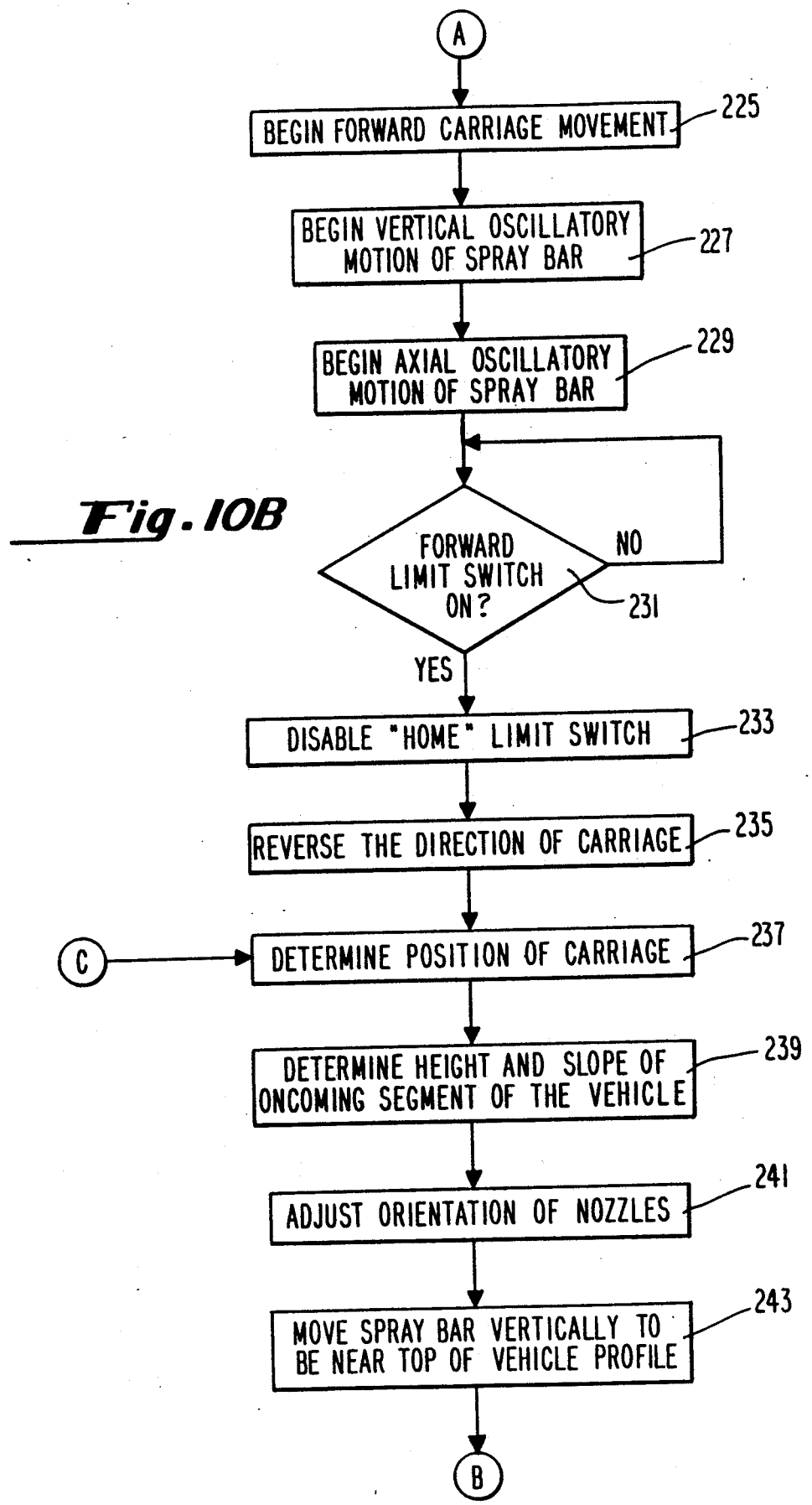
Figure 10C:
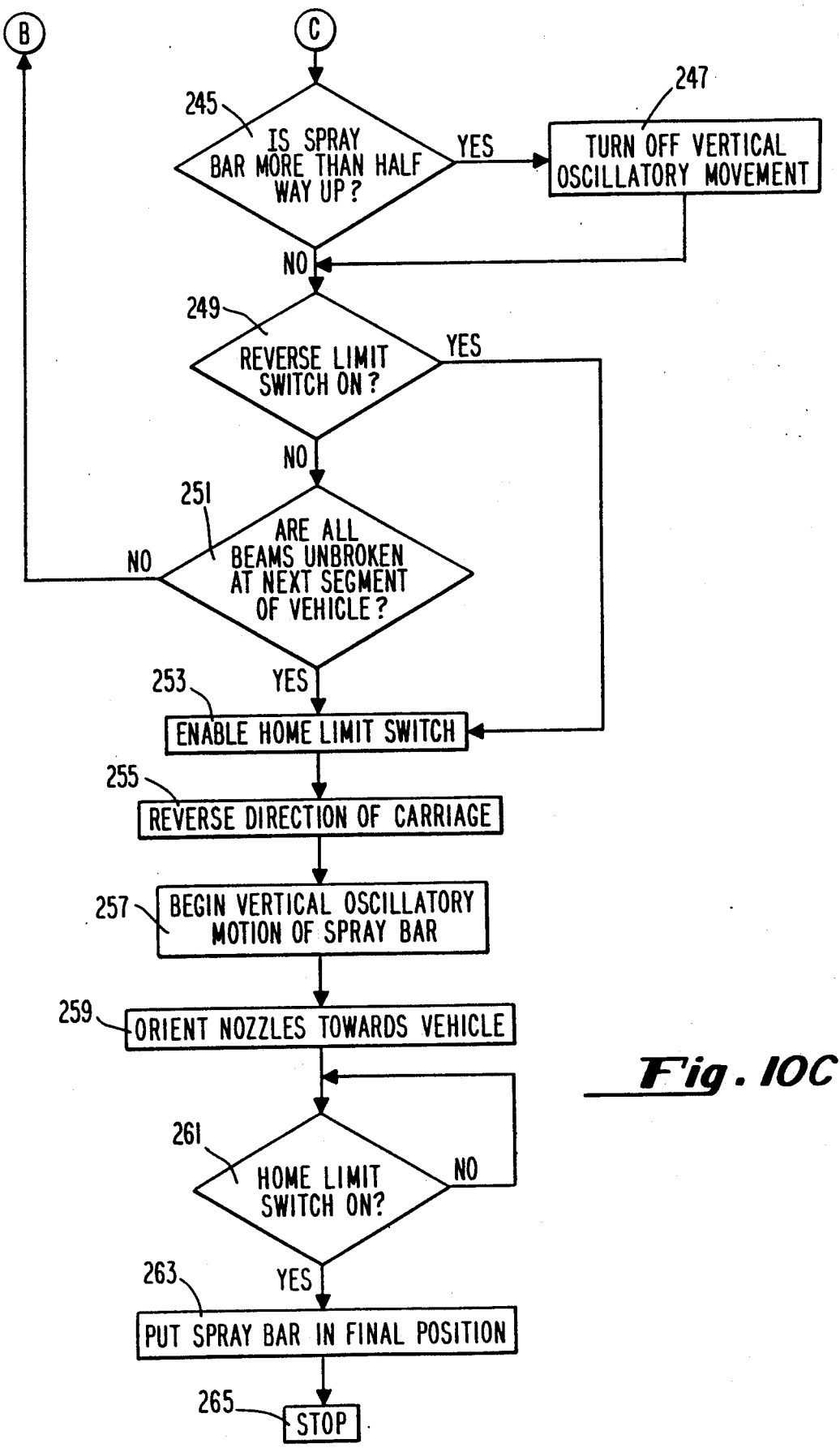

One possible means of programming of the controller is illustrated in the flow chart depicted in FIGS. 10A, 10B, and 10C. This program is only an example; many other means of programming can be used, within the scope of the invention.

The program begins in starting block 201. It is assumed that, before the program begins, the carriage is in its "home" position, and that the nozzles are oriented horizontally, facing the next vehicle to enter the system.

In test 203, the program determines whether any of the light beams in the photocell array has been broken. If not, the system repeats the test, in a continuous loop, waiting for a beam to be broken. When a beam is first broken, the program starts an internal counter, in block 205. This container generates pulses continuously, the frequency of the pulses being proportional to the speed of the conveyor. Thus, by counting the pulses, the system can determine the position of the forward end of the vehicle. The conversion of the number of pulses is symbolically represented in block 207. Note that the counter referenced in block 205 is different from the shaft encoder described earlier.

Simultaneously with the operation of the main program loop, the beginning of which has just been described, the controller also operates the smaller program loop depicted on the right hand side of FIG. 10A. In block 217, the program receives information about which of the light beams, in the photocell array, are broken. The program reads the output of the counter, in block 219, thereby obtaining an indication of the time at which the observed pattern of beam breaks was taken. The controller then stores, in its memory, in block 221, the pattern of broken beams, together with the time of the observation, taken from the value of the counter. Then, the program waits, in block 223, for a predetermined interval before returning to block 217 to take another measurement. The loop just described is executed repeatedly. The controller thus has, stored in its memory, a digitized version of the profile of the vehicle. Note that this information is stored in memory before the respective segment of the vehicle reaches the spray bar.

Clearly, the greater the number of photocell beams, and the shorter the time interval in block 223, the greater the resolution of the shape of the vehicle. In practice, it has been found that an absolutely precise profile of the vehicle is not necessary, and that a very satisfactory system can be built using only six photocell beams.

In test 209, the program then determines whether the vehicle is "X" feet from the spray bar. The value of "X" is pre-programmed into the controller, and may be about 2-3 feet, as mentioned above. This value is not critical. If the vehicle is not within this distance from the spray bar, the system returns to block 207 to recalculate the position, based on the latest value obtained from the counter. If the vehicle is within the pre-programmed distance, the system issues a command, in block 211, which forces water through the nozzles.

The program continues to convert the number of pulses, from the counter, into a signal representing the position of the vehicle, as shown in block 213, In test 215, the system determines whether the vehicle is "Y" feet from the spray bar. The value of Y is also pre-programmed, and is preferably about 1.5 feet, although this value is also not critical. If the spray bar and the vehicle are not separated by this distance, the program waits until the condition is fulfilled. When the vehicle has come within the programmed distance, the program proceeds to block 225, in FIG. 10B.

In block 225, the system now moves the carriage forward, at the same speed as the vehicle. During this time, the counter continues to operate, so that the system can determine the exact position of the carriage, from knowledge of the speed of the conveyor (and thus the carriage) and of the number of pulses generated by the counter.

In block 227, the system issues a command which begins the vertical oscillation of the spray bar. The spray bar begins to move up and down sinusoidally, as was described above. At the same time, in block 229, the system begins the small axial oscillations of the spray bar, also described above.

The program then determines, in test 231, whether the forward limit switch has been actuated. If the switch is not actuated, then the carriage has not reached the forward end of the apparatus, and the program repeats the test. If the switch is actuated, the carriage has reached the end of its forward path, and the program proceeds to block 233. In block 233, the program disables the "home" limit switch, so that, when the carriage travels in the reverse direction, it will not stop at the "home" position. The program then issues a command, in block 235, which reverses the direction of motion of the carriage.

The program now enters a loop which controls the spray bar as it traces the contour of the vehicle. This loop comprises blocks 237, 239, 241, 243, and 247, and tests 245, 249, and 251.

In block 237, the program first determines the absolute position of the carriage. This determination can be obtained from a knowledge of the speed of the motor controlling the carriage, and from the number of pulses generated by the internal counter since the carriage reversed direction. The program then determines both the height and the slope of the segment of the vehicle which lies immediately in front of the spray bar. The program can calculate this position from the knowledge of the quantities mentioned above, from the value of the original counter, which indicates the position of the forward portion of the vehicle, and from the stored information on the profile of the vehicle. Information on both the height and slope is necessary to position the spray bar and orient the nozzles properly.

The program then issues a command, in block 241, which rotates the spray bar so that the nozzles will point generally towards the oncoming segment of the vehicle. At essentially the same time, the program issues a command, in block 243, which moves the spray bar in the vertical direction, either up or down, so that the spray bar is located near the top of the segment of the vehicle.

In test 245, the program determines whether the spray bar has moved up by more than half of its maximum allowable distance of vertical travel. If so, the system deactivates the vertical oscillatory movement of the spray bar, in block 247.

The program determines in test 249, whether the reverse limit switch is actuated. If so, the system "knows" that the spray bar has reached its limit of rearward travel, and must be reversed. If the reverse limit switch is not actuated, the program determines, in test 251, whether all the light beams in the photocell array are unbroken, for the next oncoming segment of the vehicle. Note that this test is not performed on the current status of the beams, but instead is performed on the data in memory which represent the status of the beams, for the next segment along the vehicle. If all of the beams, at the next segment, are unbroken, the spray bar has passed beyond the full length of the vehicle. If they are not all unbroken, then the system must continue to follow the contour of the vehicle, and the program therefore returns to block 237, to repeat the cycle.

There are thus two ways in which the system "knows" that the tracing of the vehicle contour is complete. One is by sensing that the reverse limit switch is actuated. The other is by determining that the spray bar has completely passed by the vehicle. If the vehicle is very long, the rearward movement of the carriage is more likely to be stopped by the limit switch. If the vehicle is short, the rearward movement is more likely to be stopped when the system determines that the spray bar has passed beyond the end of the vehicle. The direction of movement of the carriage is reversed by either of these conditions, whichever occurs first.

When the reverse limit switch has been actuated, or the contour of the vehicle has been fully traversed, the program continues in block 253. The program enables the "home" limit switch, so that, when the carriage reaches the "home" position, the spray bar will stop.

The program then reverses the direction of movement of the carriage, in block 255, resumes the vertical oscillatory movement of the spray bar, in block 257, and orients the nozzles, in block 259, so that they point towards the vehicle.

The program determines, in test 261, whether the "home" limit switch has been actuated. When the switch is actuated, the washing is essentially complete. The program issues a command, in block 263, which places the carriage and spray bar in its resting position. This command includes orienting the spray bar so that the nozzles will point towards the next vehicle entering the apparatus, and moving the spray bar to a vertical position from which the front grille of the next vehicle can be most efficiently washed. The program then stops, in block 265.

While the invention has been described with respect to a particular embodiment, it is understood that the invention can be modified in many ways. The choice of the distances at which the various spraying operations begin, for example, can be changed. The programmable controller can assume many forms, and could also be replaced by a mechanical or electromechanical system. Many mechanical elements of the system could also be modified. The array of photoelectric sensors could be replaced by other, non-contacting or contacting sensing means. The principles of the present invention could even be applied to a stationary car wash, i.e. one in which the vehicle does not move, and the spray bar moves around the vehicle. These and other similar changes should be deemed within the spirit and cope of the following claims.

What is claimed is:

1. A shifting mechanism for controlling the movement of a plurality of nozzles, the nozzles being mounted on a bar, the mechanism comprising:
    (a) a first cylinder means, the first cylinder means including means for connection of one end of the cylinder means to a motor means, the other end of the first cylinder means being connected to a shifting lever,
    (b) the shifting lever being fastened around the bar, and being freely rotatable around the bar,
    (c) a second cylinder means, mounted on the shifting lever, the second cylinder means being connected, by a link, to said bar,
wherein movement of the first cylinder means causes the shifting lever to rotate, and wherein rotation of the shifting lever causes axial rotation of said bar, and wherein movement of the second cylinder means also causes axial rotation of said bar.

2. The mechanism of claim 1, wherein the connection means includes an eccentric coupling.

3. The mechanism of claim 1, wherein at least one of the cylinder means is operated by pressurized fluid.

4. A shifting mechanism for controlling the axial rotation of a bar, the bar having a plurality of nozzles for dispensing a fluid, the shifting mechanism comprising:
    (a) a first movable member, capable of linear reciprocating movement,
    (b) a second movable member, capable of linear reciprocating movement,
    (c) means for connecting said first movable member to said second movable member, the connecting means being freely rotatable around the longitudinal axis of said bar, (d) the second movable member being connected to said bar, wherein linear movement of the second movable member causes axial rotation of said bar, and wherein linear movement of the first movable member causes rotation of the connecting means so as also to cause axial rotation of said bar.

5. The shifting mechanism of claim 4, wherein the first movable member comprises a cylinder and piston, operated by a pressurized fluid.

6. The shifting mechanism of claim 5, wherein the second movable member comprises a cylinder and piston, operated by a pressurized fluid.

7. The shifting mechanism of claim 6, wherein the connecting means comprises a shifting lever, and wherein the first movable member is attached to the shifting lever at a pivot point.

8. A shifting mechanism for controlling the movement of a spray bar having a plurality of nozzles, the mechanism comprising:
  (a) a first cylinder, the first cylinder having a first piston disposed to reciprocate within the cylinder, the first piston being connected to a pivotable shifting lever, such that movement of the first piston causes pivoting motion of the shifting lever, and
  (b) a second cylinder, the second cylinder having a second piston, the second cylinder being connected to the shifting lever, the second piston also being connected to a connecting arm, the connecting arm being connected to the bar such that rotation of the connecting arm causes rotation of the bar, and wherein the shifting lever is freely rotatable around the longitudinal axis of said bar, such that movement of the second piston, without rotation of the shifting lever, causes the connecting arm to move, thereby causing the bar to rotate.

9. The shifting mechanism of claim 8, wherein the cylinders and pistons are disposed such that the nozzles are in a first angular position when the first piston is fully extended and the second piston is fully retracted, and such that the nozzles are rotated to a second angular position when both pistons are fully retracted, and such that the nozzles are rotated further to a third angular position when the first piston is fully retracted and the second piston is fully extended.

10. A shifting mechanism for controlling the axial rotation of a bar, the bar having a plurality of nozzles for dispensing a fluid, the shifting mechanism comprising:
  (a) a first movable member, capable of linear reciprocating movement,
  (b) a second movable member, capable of linear reciprocating movement,
  (c) means for connecting said first movable member to said second movable member,
  (d) the second movable member being connected to said bar, wherein linear movement of the second movable member causes axial rotation of said bar, and wherein linear movement of the first movable member causes rotation of the connecting means so as also to cause axial movement of said bar, wherein the first movable member comprises a cylinder and piston, operated by a pressurized fluid, wherein the second movable member comprises a cylinder and piston, operated by a pressurized fluid, wherein the connecting means comprises a shifting lever, and wherein the first movable member is attached to the shifting lever at a pivot point, and wherein the shifting lever is mounted on the bar, and is freely rotatable around the bar, and wherein the second movable member is connected to a connecting arm which is rigidly fastened to the bar, wherein rotation of the second movable member causes movement of the arm which causes axial rotation of the bar.

* * * * *